United States Patent
Thomas et al.

(10) Patent No.: US 6,760,801 B1
(45) Date of Patent: Jul. 6, 2004

(54) GROUND REFERENCED VOLTAGE SOURCE INPUT/OUTPUT SCHEME FOR MULTI-DROP BUS

(75) Inventors: Thomas P. Thomas, Hillsboro, OR (US); Ian A. Young, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 445 days.

(21) Appl. No.: 09/801,028

(22) Filed: Mar. 6, 2001

(51) Int. Cl.[7] .......................... G06F 13/14; H04B 3/00
(52) U.S. Cl. .................. 710/305; 710/100; 375/257; 375/377
(58) Field of Search .................. 710/100, 305; 375/257, 377

(56) References Cited

U.S. PATENT DOCUMENTS

| | | | | |
|---|---|---|---|---|
| 3,619,504 A | * | 11/1971 | De Veer et al. | 375/257 |
| 5,343,503 A | * | 8/1994 | Goodrich | 375/377 |
| 5,638,402 A | * | 6/1997 | Osaka et al. | 375/257 |
| 6,434,647 B1 | * | 8/2002 | Bittner, Jr. | 710/100 |
| 6,484,223 B1 | * | 11/2002 | Lenz | 710/305 |

* cited by examiner

Primary Examiner—Tim Vo
(74) Attorney, Agent, or Firm—Blakely, Sokoloff, Taylor & Zafman LLP

(57) ABSTRACT

A multi-drop bus input/output method and apparatus is disclosed. The apparatus comprises a multi-drop bus that has termination ends. The multi-drop bus also has a characteristic impedance. The multi-drop bus can be used for communication between devices. Devices that are attached to a termination end of the bus drive data onto the bus at the characteristic impedance. Devices that are attached to the bus, but not the termination ends, drive data onto the bus at one-half of the characteristic impedance. An end device terminates to ground with the characteristic impedance, and middle devices have high impedance, when not driving data.

19 Claims, 2 Drawing Sheets

GROUND REFERENCED VOLTAGE SOURCE INPUT/OUTPUT SCHEME FOR MULTI-DROP BUS

TECHNICAL FIELD OF INVENTION

The present invention relates generally to a computer data bus, and more specifically, to a multi-drop data bus using a ground referenced voltage source input/output scheme.

BACKGROUND OF THE INVENTION

A computer system generally includes various system components coupled to one or more internal buses. Such an internal computer bus is made up of the electrical signal lines that connect the computer components. The components may include memory or multiple processors, as an example. Typically, a computer bus is based on an industry standard so computer components of various types can be designed to operate on the bus. New bus designs are often introduced which provide increased bandwidth over prior bus designs.

As processors, memories, and other components increase in speed, printed circuit board (PCB) connections that allow these components to communicate with one another behave as transmission lines. These transmission line characteristics were always present, but as edge rates increase and the transmission rates increase, the effective line lengths become longer and the transmission line effects become especially important—important to the degree that if they are not addressed, the system may not work. Reflections in the transmission line cause distortions of the signal at the receiving end of the line. These distortions can cause false triggering in clock lines, can cause erroneous information on data, address and control lines, and can contribute significantly to clock and signal jitter.

The higher speed processors are typically used on higher speed computer buses using GTL (and its variants) bus technology. For example, recent processors from Intel Corporation of Santa Clara, Calif. are designed to operate in a quad (4) processor architecture, i.e. four multiprocessors operating on a common bus. Operating at the higher computer bus speeds required impedance matching of all loads on the computer bus to ensure signal quality and integrity.

However, GTL suffers from signal integrity problems due to imperfect driver terminations, and longer settling time for reflections from terminations and stubs. GTL also has greater power supply noise due to the use of an asymmetric output driver, which only sinks current. These factors limit the data rate and the maximum number of chips sharing the multi-drop bus. Further, GTL does not provide I/O voltage compatibility between chips of different process generations. For lower $V_{cc}$ process, GTL also requires high voltage transistors for I/O to be fabricated, which requires additional process steps.

DETAILED DESCRIPTION

Methods and apparatus' for a multi-drop bus with coupled devices are disclosed. A subject of the invention will be described with reference to numerous details set forth below, and the accompanying drawings will illustrate the invention. The following description and the drawings are illustrative of the invention and are not to be construed as limiting the invention. Numerous specific details are described to provide a thorough understanding of the present invention. However, in certain instances, well known, or conventional details are not described in order not to obscure the present invention in detail.

Figure 1:
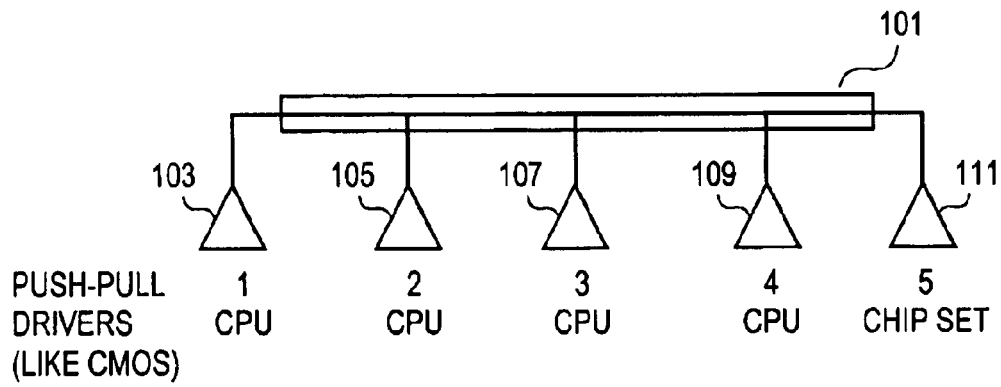
FIG. 1 is a schematic diagram of a multi-drop bus formed in accordance with the present invention.
Figure 2:
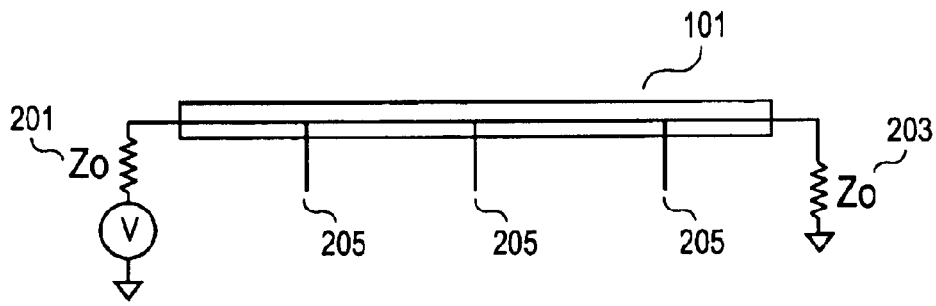
FIG. 2 is a schematic diagram of an end driver driving on a multi-drop bus formed in accordance with the present invention.
Figure 3:
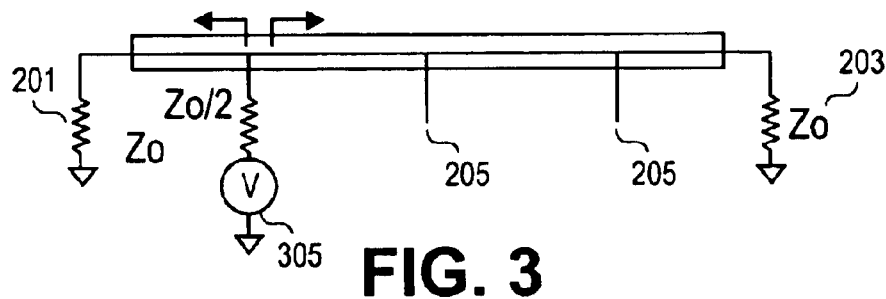
FIG. 3 is a schematic diagram of a middle driver driving on a multi-drop bus formed in accordance with the present invention.

FIGS. 1–3 illustrates an input/output scheme for a multi-drop bus in accordance with the present invention. The term multi-drop bus refers to a communications bus that has multiple devices attached thereto that can communicate with each other. The input/output scheme is referred to herein as a Ground Referenced Voltage Source (GRVS) multi-drop bus. An example of a multi-drop bus is a microprocessor front side bus, or a memory bus.

In one embodiment, the GRVS multi-drop bus of the present invention is adapted for use by devices that include standard push-pull output drivers. Additionally, a protocol for impedance matched driving of data and termination is provided by the method of the present invention. The GRVS multi-drop bus of the present invention is faster and has lower reflection and supply noise than convention input/output schemes, such as Gunning Transceiver Logic (GTL). Moreover, the present invention provides input/output voltage compatibility between chips of different process generations, e.g., chips having different power supply voltages.

Specifically, turning to FIG. 1, a multi-drop bus 101 is shown having five devices 103–111 attached thereto. Examples of the devices 103–111 can include microprocessors, memory chips, chipsets, die(s), input/output (I/O) buffers, daughter cards, etc. These devices each have an input/output driver (typically of the common push-pull type) that is coupled to the multi-drop bus 101. In this particular example shown in FIG. 1, four of the devices are microprocessors 103–109 and one of the devices is a chip set 111. However, it can be appreciated that any combination of devices may be coupled to the multi-drop bus 101.

Additionally, the devices 103–111 further include receivers to detect and receive signals on the multi-drop bus 101 and which may comprise comparators or amplifiers. The push/pull drivers and the receivers together can form parts of devices 103–111. Further, the devices 103–111 also include transmitters that can transmit signals (also referred to as drive data) onto the multi-drop bus 101 for reception by other devices. Once again, these transmitters can be formed integral to the devices 103–111. The details of the receivers and transmitters of the devices 103–111 are known to those of ordinary skill in the art.

Turning to FIG. 2, the multi-drop bus 101 has a characteristic impedance of $Z_0$. In one embodiment, $Z_0$ is 50 ohms. The GRVS input/output scheme of the present invention uses a standard push-pull output driver that behaves like a voltage source with a series resistance. The output impedance of the push-pull output driver of the CPUs 103–109 and chip set 111 can be adjusted to $Z_0$, $Z_0/2$, or an arbitrary high value (nominally infinite impedance). In one embodiment, the output driver is a programmable array of PMOS (between $V_{cc}$ and the output node) and NMOS (between the output node and ground) transistors. Thus, each CPU 103–109 or chip set 111 should be adaptable to provide a variable impedance during operation.

In operation, the protocol for impedance matched driving and termination of the present invention is as follows. Initially, there is a distinction between devices that are coupled to the terminations (or ends) of the GRVS multi-drop bus 101 and the devices that are coupled to the middle of the GRVS multi-drop bus 101. In FIG. 2, devices that are coupled to the terminations of the GRVS multi-drop bus 101 are referred to as end devices (also referred to as termination devices) and are designated by reference numbers 201 and 203. Devices that are not coupled to the terminations of the GRVS multi-drop bus 101 are referred to as middle devices and are designated by reference numeral 205.

During operation, still referring to FIG. 2, the end devices 201 and 203 always have an impedance of $Z_0$, e.g., they either drive data, or have data "0" for termination to ground. Thus, the end devices 201 and 203 drive data at $Z_0$ and are terminated to ground at $Z_0$ when not driving data.

In contrast, as seen in FIG. 3, a middle device 305 that is driving data drives data at $Z_0/2$. When the middle device 305 is driving data, the end devices 201 and 203 present an impedance of $Z_0$ to ground. Further, when the middle device 305 is driving data, the other middle devices 205 and 205 that are not driving data present a high impedance (nominally approaching infinite impedance). Thus, the middle devices have a high impedance when they are not driving data.

Thus, when the middle devices 205 are not driving data, e.g. in an idle state, they present to the bus 101 a high impedance. By having the middle device 305 drive data at $Z_0/2$, any reflections from the two terminations of the multi-drop bus 101 tend to cancel. Optimally, if the middle device 305 that is driving is positioned exactly in the middle of the multi-drop bus 101, then the reflections will cancel more effectively than if the middle device 305 that is driving is positioned away from the exact middle of the multi-drop bus 101.

As seen above, the behavior of the end devices 201 and 203 differ from that of the middle drivers 205. Thus, generic devices need to be configured based upon their physical placement on the GRVS multi-drop bus 101. In one embodiment, the devices have a toggle switch or pin that can be switched, or set to a specific voltage based upon its placement or location on the GRVS multi-drop bus 101.

The GRVS input/output scheme of the present invention reduces reflection noise and has a faster settling time due to improved terminations. Because the GRVS drivers in the devices 103–111 both source and sink current, on-chip and package decoupling capacitors can be used to produce less power supply noise, compared to GTL drivers, which only sink current and use the decoupling capacitor that is typically on a mounting board.

Further, it is not uncommon for chip sets that use older generation processes that have a higher voltage $V_{cc-old}$ to be used in combination with newer generation microprocessors that have a lower voltage $V_{cc-new}$. The GRVS input/output scheme of the present invention provides backward voltage compatibility to allow devices having different operating voltages to be connected to the same GRVS multi-drop bus 101. The signal swing for the GRVS input/output multi-drop bus 101 is $V_{cc}/2$, ground referenced, which provides input/output voltage compatibility between chips of different process generations. This is illustrated in FIG. 4.

Figure 4:
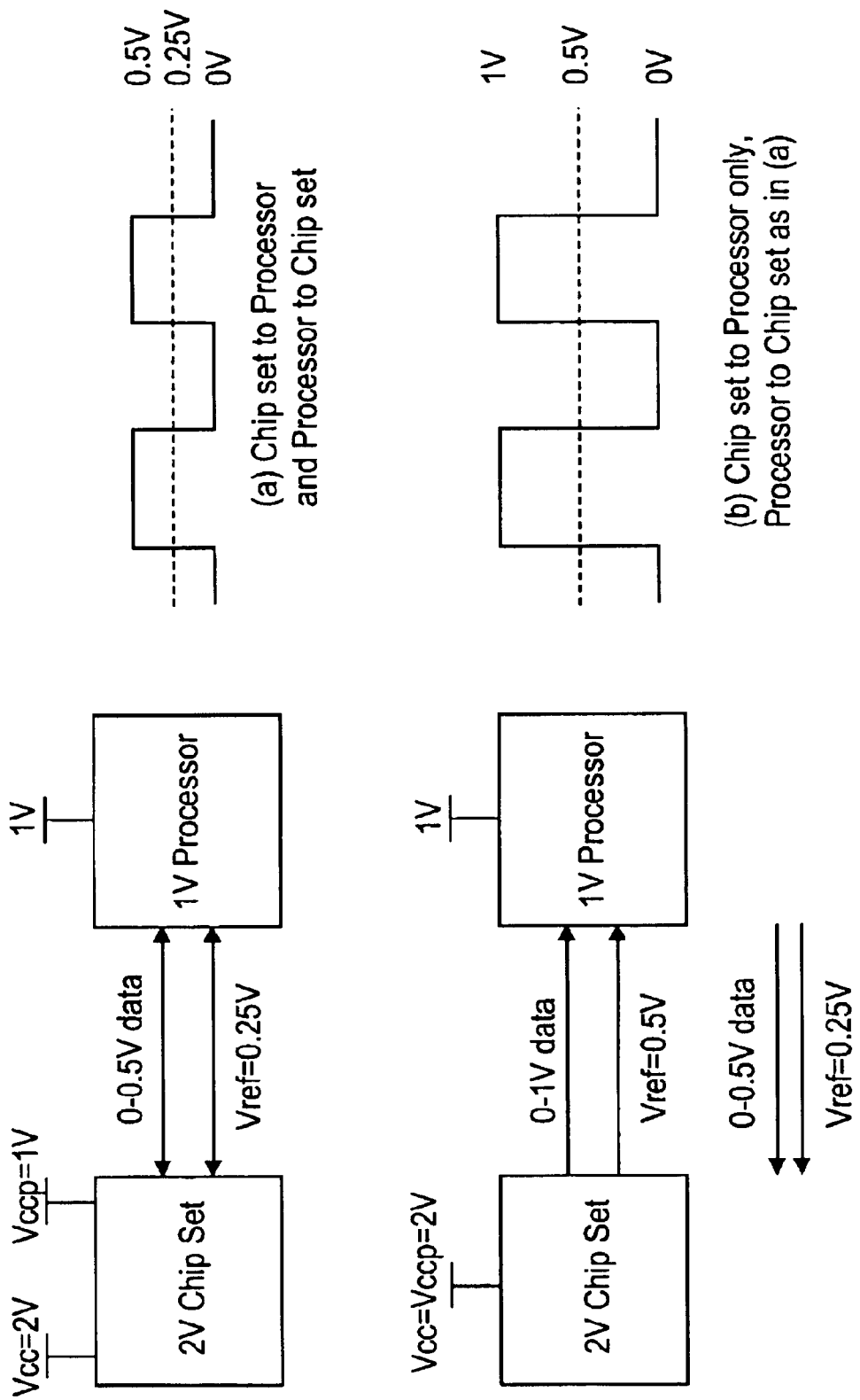
FIG. 4 is a schematic diagram illustrating data signaling on a multi-drop bus having devices attached thereto that have different power supply voltages.

Specifically, as seen in FIG. 4, an older generation device that has a high supply voltage, $V_{cc-old}$ can also use the lower voltage $V_{cc-new}$ of the newer process generations for its output drivers, if its output driver power supply ($V_{ccp}$) is not tied to the core power supply, $V_{cc-old}$. Otherwise, $V_{ref}$ can be set at $V_{cc}/4$ and changed depending on the driver chip (for example $V_{cc-old}/4$ or $V_{cc-new}/4$), which allows up to a two times difference in the $V_{cc}$'s of the different process generation chips. If $V_{cc-old}$ is twice of $V_{cc-new}$, the output voltage swing is from ground to $V_{cc-old}/2$, which is equal to $V_{cc-new}$, can be safely received by the $V_{cc-new}$ chip.

While specific embodiments and applications of the present invention have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present invention disclosed herein without departing from the spirit and scope of the invention.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a multi-drop bus having a first termination and having a characteristic impedance;
   a termination device coupled to said first termination, the termination device to drive data onto said bus at said characteristic impedance; and
   a middle device coupled to said bus, the middle device to drive data onto said bus at one-half of said characteristic impedance.

2. The apparatus of claim 1 wherein said termination device has an output impedance equal to said characteristic impedance when not driving data onto said bus.

3. The apparatus of claim 1 wherein said middle device has a high impedance when not driving data onto said bus.

4. The apparatus of claim 1, further comprising:
   a second termination device coupled to a second termination of said bus, the second termination device capable of driving data onto said bus at said characteristic impedance.

5. The apparatus of claim 1 wherein said termination device and said middle device each include a push-pull output driver that drives data onto said bus.

6. The apparatus of claim 1 wherein said termination device is terminated to ground when not driving data.

7. The apparatus of claim 4 wherein said middle device is placed equidistant from said first termination and said second termination.

8. An apparatus, comprising:
   a multi-drop bus having at least one termination end and having a characteristic impedance;
   a first device attached to said bus, said first device to drive data onto said bus at said characteristic impedance if said first device is coupled to said termination end and drive data onto said bus at one-half of said characteristic impedance if said first device is not coupled to said termination end; and
   a second device attached to said bus, said second device to drive data onto said bus at said characteristic impedance if said second device is coupled to said termination end and drive data onto said bus at one-half of said characteristic impedance if said second device is not coupled to said termination end.

9. The apparatus of claim 8 wherein said first device and said second device each include a push-pull output driver that drives data onto said bus.

10. The apparatus of claim 8 wherein said first device and said second device have said characteristic impedance when not driving data onto said bus and when coupled to said termination end.

11. The apparatus of claim 8 wherein said first device and said second device have a high impedance when not driving data onto said bus and when not coupled to said termination end.

12. The apparatus of claim 8 wherein said first device and said second device are terminated to ground when not driving data onto said bus and when coupled to said termination end.

13. A method, comprising:
providing a multi-drop bus having at least one termination end and having a characteristic impedance;
coupling a termination device to said at least one termination end;
if said termination device is transmitting data over said bus, driving data with said termination device onto said bus at said characteristic impedance; and
coupling a middle device to said bus;
if said the middle device is transmitting data over said bus, driving data with said middle device onto said bus at one-half of said characteristic impedance.

14. The method of claim 13, further comprising:
if said termination device is not driving data onto said bus, having said termination device present said characteristic impedance to said bus.

15. The method of claim 13, further comprising:
if said middle device is not driving data onto said bus, having said middle device present a high impedance to said bus.

16. The method of claim 13, further comprising:
coupling a second termination device to a second termination end of said bus; and
if said second termination device is transmitting data over said bus, driving data with said second termination device onto said bus at said characteristic impedance.

17. The apparatus of claim 13 further wherein if said termination device not is transmitting data over said bus, terminating said termination device to ground.

18. The apparatus of claim 16 wherein said middle device is coupled to said bus at a location equidistant from said at least one termination end and said second termination end.

19. The method of claim 16 wherein said middle device is coupled to said bus at a location not equidistant from said at least one termination end and said second termination end.

* * * * *